United States Patent
Debayle et al.

(10) Patent No.: US 8,389,674 B2
(45) Date of Patent: Mar. 5, 2013

(54) METHOD FOR PRODUCING A POLYCHLOROPRENE-BASED POLYMER DISPERSION AND SYSTEM FOR PRODUCING A POLYCHLOROPRENE-BASED POLYMER DISPERSION

(75) Inventors: Pascal Debayle, Moulin de France (FR); Peter Hoeltzenbein, Calgary (CA); Renke Mottweiler, Leverkusen (DE); Eberhardt Muller, Dormagen (DE); Rainer Grafe, Rommerskirchen (DE); Christian Mahner-Wolfarth, Dormagen (DE); Thomas-Oliver Neuner, Hilden (DE); Mesut Fidan, Dormagen (DE); Marc Lagarde, Lyons (FR)

(73) Assignee: Lanxess Deutschland GmbH, Leverkusen (DE)

( * ) Notice: Subject to any disclaimer, the term of this patent is extended or adjusted under 35 U.S.C. 154(b) by 0 days.

(21) Appl. No.: 13/490,680

(22) Filed: Jun. 7, 2012

(65) Prior Publication Data

US 2012/0309893 A1 Dec. 6, 2012

Related U.S. Application Data

(63) Continuation of application No. 13/264,827, filed as application No. PCT/EP2010/054303 on Mar. 31, 2010, now abandoned.

(30) Foreign Application Priority Data

Apr. 17, 2009 (EP) .................................... 09158147

(51) Int. Cl.
*C08F 6/00* (2006.01)
*C08J 3/00* (2006.01)
(52) U.S. Cl. ...................................................... 528/501
(58) Field of Classification Search .................. 528/501
See application file for complete search history.

(56) References Cited

U.S. PATENT DOCUMENTS

| 4,278,506 | A | 7/1981 | Irvin |
| 5,407,993 | A | 4/1995 | Lyons et al. |
| 2002/0120045 | A1 | 8/2002 | Musch et al. |
| 2006/0069196 | A1 | 3/2006 | Grabowski et al. |
| 2008/0076855 | A1 | 3/2008 | Reif et al. |

FOREIGN PATENT DOCUMENTS

| DE | 102006060378 A1 | 7/2007 |
| EP | 1624018 A | 2/2006 |
| EP | 1903063 A | 3/2008 |
| WO | WO 02/24825 A | 3/2002 |
| WO | WO 2004/106422 A | 12/2004 |

OTHER PUBLICATIONS

International Search Report dated Jun. 9, 2010 for International Application No. PCT/EP2010/054303.
Written Opinion dated Oct. 17, 2011 for International Application No. PCT/EP2010/054303.

*Primary Examiner* — Terressa Boykin
(74) *Attorney, Agent, or Firm* — O'Brien Jones, PLLC

(57) ABSTRACT

Disclosed are systems and methods for producing a polymer dispersion based on polychloroprene, comprising steps of polymerizing chloroprene to polychloroprene, adding the polycholoprene dispersion to a stripper column, and removing chloroprene from the polychloroprene dispersion.

24 Claims, 1 Drawing Sheet

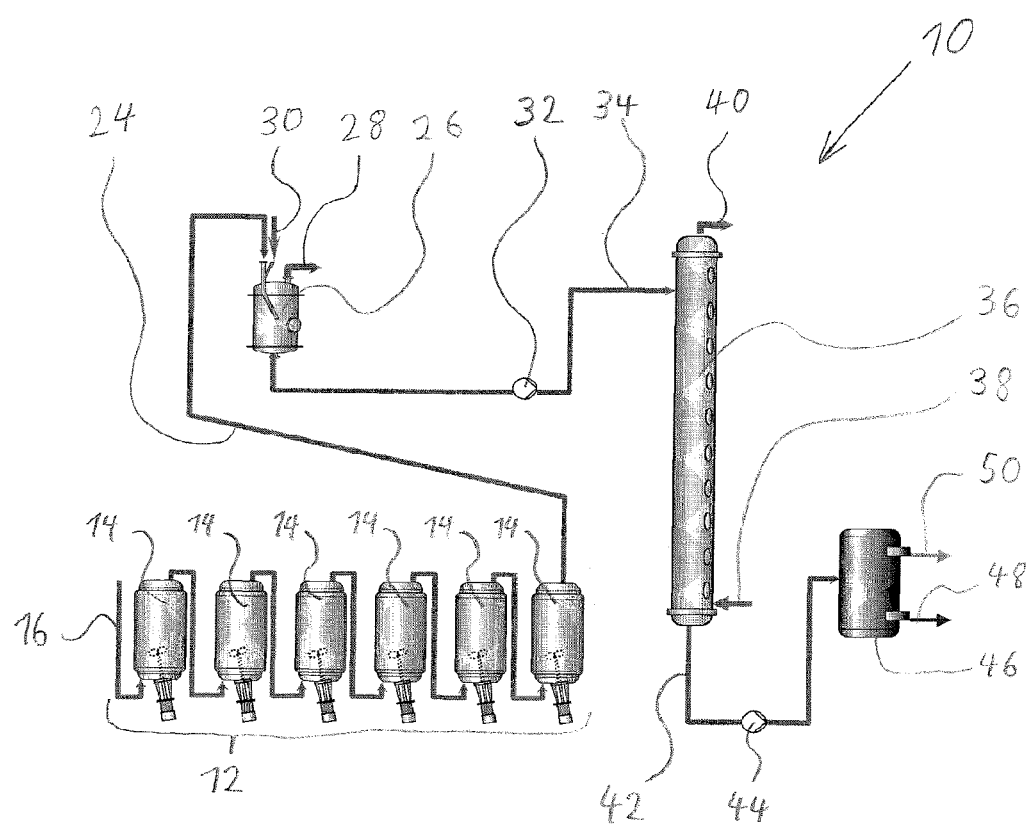

METHOD FOR PRODUCING A POLYCHLOROPRENE-BASED POLYMER DISPERSION AND SYSTEM FOR PRODUCING A POLYCHLOROPRENE-BASED POLYMER DISPERSION

This is a continuation of U.S. patent application Ser. No. 13/264,827, which is the U.S. National Stage of International Application No. PCT/EP2010/054303, filed Mar. 31, 2010, which claims priority to European Application No. 09158147.0, filed Apr. 17, 2009. The entire disclosure of each and all of these documents is incorporated herein by reference.

The present invention relates to a process and a plant for producing a polymer dispersion based on polychloroprene.

It is known from DE 10 2006 060 378 A1 that a polychloroprene (CR) dispersion can be obtained by polymerization of monomeric chloroprene, where from 50% to 95% of the chloroprene used is reacted in the polymerization. In a subsequent steam distillation, unpolymerized chloroprene (residual monomer) can be decreased to a proportion of monomeric chloroprene in the polychloroprene dispersion of about 100 ppm or 50 ppm and less.

According to JP 61-060843 B2, steam distillation of polychloroprene dispersions has in practice been found to be uneconomical since lines and apparatuses of the steam distillation column used very quickly become blocked by polychloroprene coagulum formed and the steam distillation column used would have to be shutdown and cleaned after a short period of operation.

Polymer dispersions based on polychloroprene are used, for example, for diving goods, moulded foam or as constituent of contact adhesives. Since monomeric chloroprene is readily flammable and toxic, there is a continuing need to reduce the proportion of monomeric chloroprene (residual monomer) in polychloroprene dispersions further in order to improve and aid the handling of products produced on the basis of polychloroprene dispersions, for example adhesives.

It is an object of the invention to provide a process and an apparatus for producing a polymer dispersion based on polychloroprene, with the aid of which the proportion of monomeric chloroprene in polychloroprene dispersions can be reduced without a significant reduction in the time of operation of the plant components used having to be accepted.

The object is achieved according to the invention by a process having the features of Claim 1 and a plant having the features of Claim 11. Advantageous embodiments of the invention are defined in the dependent claims.

In the process of the invention for producing a polymer dispersion based on polychloroprene, a polymerization of chloroprene to polychloroprene is carried out in an emulsion up to a maximum solids content $w_{solid}$ of proportions by weight of $w_{solid} \leq 50\%$, in particular $w_{solid} \leq 40\%$, preferably $w_{solid} \leq 35\%$ and particularly preferably $w_{solid} \leq 30\%$ in a polychloroprene dispersion present after the polymerization and a removal of chloroprene from the polychloroprene dispersion is carried out in a multistage and/or multitray stripper column to a chloroprene content $w_{CR,out}$ in proportions by weight of $w_{CR,out} \leq 50$ ppm, in particular $w_{CR,out} \leq 30$ ppm, preferably $w_{CR,out} \leq 15$ ppm and particularly preferably $w_{CR,out} \leq 10$ ppm in a purified polychloroprene dispersion present after the removal of chloroprene. A dilution of the product obtained with aqueous phase and/or water carried out during and/or after the chemical polymerization reaction is considered to be part of the polymerization.

The solid in the polychloroprene dispersion after the polymerization is made up essentially of polychloroprene. The determination of the solids content is carried out in accordance with ISO 124. The proportion by weight of polychloroprene in the solids in the polychloroprene dispersion is, in particular, $\geq 80\%$, preferably $\geq 90\%$. The minimum proportion by weight $w_{CR,out,min}$ of chloroprene in the purified polychloroprene dispersion present after removal of chloroprene is, in particular, $w_{CR,out,min} \geq 1$ ppm, preferably $w_{CR,out,min} \geq 0.5$ ppm. The minimum proportion by weight $w_{CR,out,min}$ of chloroprene is particularly preferably below the detection limit of customary routine analytical methods, which is generally 0.5 ppm. The minimum proportion by weight $w_{solid,min}$ of solid in the polychloroprene dispersion present after the polymerization is, in particular, $w_{solid,min} \geq 10\%$, preferably $w_{solid,min} \geq 15\%$ and particularly preferably $w_{solid,min} \geq 20\%$, in order to make particularly economical operation of the process of the invention possible.

Compared to conventional continuous and/or discontinuous polymerizations of chloroprene to polychloroprene, a significantly lower proportion of polychloroprene in the polychloroprene dispersion after the polymerization is deliberately set in the process of the invention. This can be achieved, for example, by means of a lower conversion of chloroprene and/or a larger amount of aqueous phase than is usually provided, with a dilution of the product obtained with aqueous phase and/or water carried out during and/or after the chemical polymerization reaction being considered to be part of the polymerization. Here, use is made of the recognition that the lower proportion of polychloroprene in the polychloroprene dispersion after the polymerization leads to a significantly lower solids content in the polychloroprene dispersion, as a result of which removal of chloroprene in a stripper column, for example by means of steam, is surprisingly possible without lines or apparatuses blocked by polychloroprene coagulum having to be feared. It is even possible to reduce the chloroprene content of the purified polychloroprene dispersion significantly without having to accept a significantly increased risk of downtimes of the stripper column. In the process of the invention, uninterrupted periods of operation of the stripper column used of more than 3 weeks, in particular more than 5 weeks and particularly preferably of more than 6 weeks, can be achieved, while a maximum period of operation of less than one day was found at a solids content $w_{solid}$ of about 55%. The polymerization can, in particular, be carried out by emulsion polymerization in an alkaline aqueous medium, as described, for example, in "Ullmanns Encyclopedia of Polymer Science and Technology", Vol. 3, pp. 705-730, John Wiley, New York 1965, with, as a difference, the maximum solids content $w_{solid}$ in the polychloroprene dispersion after the polymerization as provided according to the invention being taken into account and process conditions suitable for this purpose being employed.

It is assumed that, owing to the lower solids content based on the amount of polychloroprene, a comparatively large amount of aqueous phase is present in the stripper column and the aqueous phase present prevents formation of lumps of polychloroprene and caking of the polychloroprene as a result of coagulum formation in the stripper column. In the process of the invention, the solids content of the polychloroprene dispersion after the polymerization is, in particular based on the aqueous phase, set so that blockages are avoided and at the same time a particularly low proportion of chloroprene can be achieved in the polychloroprene dispersion leaving the stripper column. The stripper column is, in particular, operated in such a way that the steam used condenses at least partly. As a result, the heat of condensation can firstly be used for heating and, at the same time, the amount of aqueous phase can be increased by the amount of the condensate, so that an unfavourably high solids content within the stripper column can be avoided. The stripper column can, in particular, be formed by a single tower having a plurality of trays, with each tray defining the commencement of an individual stage of the stripping process assigned to the respective tray. In particular, stripping can be carried out at a pressure of ≦1 bar in order to aid vaporization of chloroprene. Although a comparatively low polychloroprene content is deliberately set in the polymerization, this measure has been found to be more economical overall taking into account the chloroprene removal. As a result of the improved degassing of chloroprene from the polychloroprene dispersion and the resulting lower amount of chloroprene in the finished product, handling of products produced on the basis of polychloroprene dispersions, for example adhesives, is improved and aided. In particular, occupational hygiene is improved in the further processing of the polychloroprene dispersion, for example to produce a solid rubber. Occupational safety in the further processing is improved, as a result of which lower occupational safety requirements are even made possible.

The polychloroprene dispersion fed to the stripper column preferably comprises essentially the entire aqueous phase of the polychloroprene dispersion present immediately after the polymerization, with, in particular, additional aqueous phase and/or water having been added to the polychloroprene dispersion before introduction into the stripper column. In particular, essentially only chloroprene, if anything, is removed from the organic phase, preferably by vaporization. Intermediate removal of liquid constituents such as aqueous phase, emulsifier, catalyst, stabilizer, activator or stopper can be avoided. Instead, additional aqueous phase and/or water can be added to the polychloroprene dispersion in order to reduce or adjust the solids content $w_{solid}$. In particular, the polychloroprene dispersion present after the polymerization is fed continuously and/or directly to the stripper column.

The polymerization is particularly preferably carried out continuously or pseudocontinuously, in particular by means of a cascade of a plurality of batch reactors. Since a particularly high polychloroprene content is not desirable after the polymerization because of the increased solids content in the process of the invention, it is possible for the first time to provide a continuous or pseudocontinuous polymerization which is more economical on an industrial scale than a plurality of batch reactions. It is also possible to connect a plurality of individual tank reactors in series in order to achieve a pseudocontinuous polymerization which is likewise more economical on an industrial scale than a plurality of batch reactions.

In a further embodiment, the polymerization is carried out predominantly by means of a batch reaction in at least one batch reactor, with the polychloroprene dispersion present after the polymerization being fed to a buffer tank before the separation in the stripper column and the polychloroprene dispersion being fed essentially continuously to the stripper column from the buffer tank. This makes continuous operation of the stripper column possible even when the polymerization is carried out discontinuously, so that the stripper column can be operated particularly economically. The respective polymerization is particularly preferably carried out offset in time in various batch reactors, so that the buffer tank can be filled with the product obtained in a respective batch reaction in correspondingly shorter time intervals. In particular, additional aqueous phase is fed to the buffer tank in order to ensure the desired maximum solids content $w_{solid}$.

In particular, the polychloroprene dispersion fed to the stripper column has a chloroprene content $W_{CR,in}$ in proportions by weight of 200 ppm≦$W_{CR,in}$≦30 000 ppm, in particular 2000 ppm≦$W_{CR,in}$≦20 000 ppm and particularly preferably 5000 ppm≦$W_{CR,in}$≦15 000 ppm. At such a chloroprene content $W_{CR,in}$ of the polychloroprene dispersion in the feed stream to the stripper column, blockage of the stripper column can be avoided with certainty and at the same time a chloroprene content of $w_{CR,out}$≦30 ppm and even $w_{CR,out}$≦10 ppm in the degassed polychloroprene dispersion present after the removal of chloroprene can be achieved.

Degassing of the polychloroprene dispersion present after the polymerization is preferably carried out after the polymerization has been carried out and before the removal of chloroprene. In this way, components which are already in gaseous form and volatile components can be removed from the polychloroprene dispersion without the stripper column being used for this purpose. This makes it possible to remove a proportion by weight of about 90% of the monomeric chloroprene. This reduces the amount of steam required for the removal of chloroprene in the stripper column.

The purified polychloroprene dispersion is particularly preferably concentrated, in particular by means of a creaming process, after the removal of chloroprene. This is carried out, for example, as described in DE 10 145 097 with the aid of a coalescing agent or as described in "Neoprene Latices", John C. Carl, E. I. DuPont 164, p. 13. The additional concentration makes it possible for some more chloroprene to be additionally separated off to a small extent. At the same time, the solids content of polychloroprene in the product polychloroprene dispersion remaining after the separation phase formed has been separated off is increased. Subsequent transport quantities and transport costs for the polychloroprene can be reduced in this way.

In particular, a vapour, in particular essentially steam, having an overpressure $\Delta p$ compared to the pressure of the polychloroprene dispersion fed in of 3 bar≦$\Delta p$≦10 bar, in particular 4 bar≦$\Delta p$≦9 bar, preferably 5 bar≦$\Delta p$≦8 bar and particularly preferably 6 bar≦$p$≦7 bar, and/or a temperature at the bottom of 55° C.≦T≦110° C., in particular 60° C.≦T≦100° C., preferably 65° C.≦T≦90° C. and particularly preferably 70° C.≦T≦80° C. is fed to the stripper column. A vapour selected in this way allows the predominant proportion of chloroprene to be removed even in a relatively large stripper column having a plurality of trays. The vapour enables the chloroprene present to be vaporized down to a few ppm and to be discharged via the top and be, for example, reused for a further polymerization of chloroprene to polychloroprene.

A ratio R of a mass flow of a vapour fed into the stripper column, in particular essentially steam, to a mass flow of the polychloroprene dispersion fed to the stripper column preferably obeys the relationship 0.04≦R≦0.20, in particular 0.06≦R≦0.17, preferably 0.08≦R≦0.14 and particularly preferably 0.09≦R≦0.12. At this vapour to polychloroprene dispersion ratio R, the chloroprene present in the polychloroprene dispersion fed in can be removed down to a few ppm in an energy-efficient way.

The stripper column particularly preferably has a number N of stages and/or trays such that 5≦N≦35, in particular 8≦N≦20, preferably 10≦N≦14 and particularly preferably 11≦N≦13. Such a number N, for example N=12, has been found to be particularly economical, with a larger number N naturally being technically possible for particularly small chloroprene contents in the purified polychloroprene dispersion. In particular, a single tower having N trays, with the number of trays corresponding to the number of stages, can be used for the stripper column. At such a number of stages or trays, a particularly high proportion of chloroprene can be removed without blockage of the stripper column occurring. The high purity of the purified polychloroprene dispersion is at the same time achieved particularly economically at low cost.

In particular, the stripper column has a stage height h such that, in particular, 800 mm≦h≦1500 mm, preferably 1000 mm≦h≦1300 mm and particularly preferably 1100 mm≦h≦1200 mm, and/or a stage and/or a tray of the stripper column has, based on a circular cross section, a diameter D such that, in particular, 500 mm≦D≦5000 mm, preferably 1000 mm≦D≦3000 mm and particularly preferably 1500 mm≦D≦2000 mm. The stage height h is defined by the distance between two adjacent trays. As trays, it is possible to use, in particular, sieve trays. This dimensioning of the stripper column gives a good separation performance at a comparatively low outlay. At the same time, the stripper column can easily be serviced and cleaned.

The invention further provides a plant for producing a polymer dispersion based on polychloroprene, in particular for carrying out the process configured and developed as described above, having a polymerization unit for the polymerization of chloroprene to polychloroprene in an emulsion, where the polymerization unit is dimensioned as a function of the formulation used so that a polychloroprene dispersion present after the polymerization having a maximum solids content $w_{solid}$ in proportions by weight of $w_{solid} \leq 50\%$, in particular $w_{solid} \leq 40\%$, preferably $w_{solid} \leq 35\%$ and particularly preferably $w_{solid} \leq 30\%$, can be obtained and a multistage and/or multitray stripper column connected directly or indirectly to the polymerization unit for the removal of chloroprene from the polychloroprene dispersion, where the stripper column is dimensioned, as a function of the polychloroprene dispersion fed to the stripper column, so that a purified polychloroprene dispersion present after the removal of chloroprene having a chloroprene content $w_{CR,out}$ in proportions by weight of $w_{CR,out} \leq 50$ ppm, in particular $w_{CR,out} \leq 30$ ppm, preferably $W_{CR,out} \leq 15$ ppm and particularly preferably $w_{CR,out} \leq 10$ ppm, can be obtained.

Owing to the appropriate dimensioning of the polymerization unit and of the stripper column, the proportion of monomeric chloroprene in polychloroprene dispersions can be reduced without a significant reduction in the operating times of the plant components used having to be accepted. As a result of the low solids content of the polychloroprene dispersion after the polymerization, the monomeric chloroprene (residual monomer) can be removed from the polychloroprene dispersion down to a few ppm without the risk of blockage of the stripper column. The plant can, in particular, be configured and developed as explained above for the process of the invention.

The stripper column particularly preferably has, at least in part, a heat-insulating and/or thermally insulating cladding. The energy introduced by the vapour into the stripper column is in this way largely kept in the stripper column without being given off to the environment by natural cooling. The amount of vapour required can be reduced as a result. At the same time, it can be ensured that even in the case of a large number of stages and/or trays in the stripper column, the vapour has a sufficiently high temperature to vaporize and carry out chloroprene even in the uppermost stages or trays. Additional introduction of vapour at a higher point in the stripper column can be avoided in this way.

The invention further relates to a joining process for joining a first part to a second part, wherein an adhesive which has been produced using a polymer dispersion based on polychloroprene is employed as joining means and the polymer dispersion has been produced by a process as described above and/or by means of a plant as described above. Owing to the particularly low residual monomer content of the polychloroprene dispersion, the adhesive produced from this polychloroprene dispersion also has a particularly low chloroprene content. The risk to the environment and/or the health of a user posed by this adhesive during joining of parts is significantly reduced.

The invention will hereinafter be illustrated by way of example with reference to the accompanying drawing by means of a preferred example. In the FIGURE:

FIG. 1 shows a schematic flow diagram of the plant of the invention for carrying out the process of the invention.

The plant 10 shown in FIG. 1 has a polymerization unit 12 which is configured as a cascade of stirred tanks having six stirred tanks 14 connected in series in order to carry out a pseudocontinuous polymerization in the polymerization unit 12. Chloroprene, recycled chloroprene, solvent such as aqueous phase and/or $H_2O$ are introduced via a feed line 16 into the polymerization unit. The polymerization unit 12 is dimensioned on the basis of the formulation used and/or the process conditions used in such a way that a polychloroprene dispersion leaving the polymerization unit 12 via a polymerization outlet line 24 has a comparatively low content of polychloroprene solid. For example, the reaction temperature and/or the number of stirred tanks 14 is selected appropriately. In addition or as an alternative, it is possible to set the conversion of chloroprene and/or the amount of solvent appropriately.

The polychloroprene dispersion present after the polymerization is fed via the polymerization outlet line 24 to a preliminary degassing unit 26 in order to separate off gaseous and/or volatile constituents of the polychloroprene dispersion via a degassing line 28 and work them up if appropriate. Worked-up components which have been separated off via the degassing line 28 can, if appropriate, be returned to the polymerization unit 12 via the feed line 16. To aid the degassing of volatile constituents of the polychloroprene dispersion, steam can be blown into the degassing unit 26 via a steam feed line 30.

The polychloroprene dispersion can be fed by means of a first pump 32 via a stripper feed line 34 to a stripper column 36 having, for example, eleven trays in an upper region of the stripper column 36. In a lower region of the stripper column 36, steam is blown into the stripper column 36 via a steam inlet line 38 in order to separate off the residual monomer of the polychloroprene dispersion overhead in the form of monomeric chloroprene via a vapour outlet line 40. The chloroprene which has been separated off via the vapour outlet line 40 can be worked up and returned to the polymerization unit 12 via the feed line 16.

The polychloroprene dispersion which has been purified in the stripper column 36 and is taken off via a stripper outlet line 42 has a chloroprene content of only a few ppm, with the proportion by weight of chloroprene in the purified polychloroprene dispersion being significantly less than 50 ppm, and being able, in particular, to be 10 ppm or less. The purified polychloroprene dispersion can be fed by means of a second pump 44 to a creaming unit 46 where the polychloroprene in the purified polychloroprene dispersion is concentrated. In the creaming unit 46, two separable phases are, for example, produced, and a concentrated polychloroprene product dispersion can be discharged via a product outlet line 48. The other phase can be separated off via a separation phase outlet line 50 and, if appropriate, worked up and reused.

The invention claimed is:

1. A method of producing a polymer dispersion based on polychloroprene, comprising the steps of:
   polymerizing chloroprene to polychloroprene in an emulsion having a maximum solids content $w_{solid}$ of chloroprene in an amount up to about 50% by weight, in a polychloroprene dispersion;
   adding the polycholoprene dispersion to a stripper column; and
   removing chloroprene from the polychloroprene dispersion in the stripper column to collect a chloroprene content $w_{CR,out}$ in an amount up to about 50 ppm, by weight, in a polychloroprene dispersion.

2. The method of claim 1, wherein the maximum solids content $w_{solid}$ of chloroprene in the emulsion ranges up to about 30% by weight.

3. The method of claim 1, wherein the stripper column may be any one of a multistage stripper column, a multitray stripper column, or a combination thereof.

4. The method of claim 1, wherein the chloroprene content $w_{CR,out}$ is present in an amount up to about 10 ppm by weight in a polychloroprene dispersion.

5. The method according to claim 1, further comprising the step of adding an additional aqueous phase, water, or a combination thereof, to the polychloroprene dispersion before adding the polycholoprene to the stripper column,
   wherein the polychloroprene dispersion added to the stripper column contains substantially all of the aqueous phase of the polychloroprene dispersion present immediately after the polymerization.

6. The method according to claim 1, the polymerizing step further including a batch reaction in at least one batch reactor,
   wherein the polychloroprene dispersion present after the polymerization is introduced into a buffer tank before being added to the stripper column, and
   wherein the polychloroprene dispersion is added substantially continuously from the buffer tank to the stripper column.

7. The method according to claim 1, wherein the polychloroprene dispersion added to the stripper column has a chloroprene content $w_{CR,in}$ in an amount ranging from about 200 ppm to about 30,000 ppm, by weight.

8. The method of claim 7, wherein the polychloroprene dispersion added to the stripper column has a chloroprene content $w_{CR,in}$ ranging from about 5000 ppm to about 15,000 ppm by weight.

9. The method according to claim 1, further comprising the step of degassing the polychloroprene dispersion present after the polymerization, wherein the degassing is carried out after the polymerizing step and before the step of removing chloroprene.

10. The method according to claim 1, further comprising the step of concentrating the purified polychloroprene dispersion through a creaming process, after the step of removing chloroprene.

11. The method according to claim 1, wherein a vapor, having an overpressure $\Delta p$ compared to the pressure of the polychloroprene dispersion added in an amount ranging from about 3 bar to about 10 bar and/or a temperature at the bottom of the stripper column of about 55° C. to about 110° C. is added to the stripper column.

12. The method of claim 11, wherein a vapor having an overpressure $\Delta p$ compared to the pressure of the polychloroprene dispersion fed in an amount ranging from about 6 bar to about 7 bar is added to the stripper column.

13. The method of claim 11, wherein a vapor having a temperature at the bottom of the stripper column of about 70° C. to about 80° C. is added to the stripper column.

14. The method according to claim 1, wherein a ratio R of a mass flow of a vapor added to the stripper column to a mass flow of the polychloroprene dispersion fed to the stripper column ranges from about 0.04 to about 0.20.

15. The method of claim 14, wherein the ratio R of a mass flow of a vapor added to the stripper column to a mass flow of the polychloroprene dispersion added to the stripper column ranges from about 0.09 to about 0.12.

16. The method according to claim 1, wherein the stripper column has a number N of stages and/or trays ranging from about 5 to about 35.

17. The method of claim 16, wherein the stripper column has a number N of stages and/or trays ranging from about 11 to about 12.

18. The method according to claim 1, wherein the stripper column has a stage height h ranging from about 800 mm to about 1500 mm, and/or a stage and/or a tray of the stripper column has, based on a circular cross section, a diameter D ranging from about 500 mm to about 5000 mm.

19. The method of claim 18, wherein the stripper column has, based on a circular cross section, a diameter D ranging from about 1500 mm to about 2000 mm.

20. A system for carrying out a method of preparing a polymer dispersion based on polychloroprene, said method comprising the steps of
   polymerizing chloroprene to polychloroprene in an emulsion having a maximum solids content $w_{solid}$ of chloroprene in an amount up to about 50% by weight, in a polychloroprene dispersion;
   adding the polycholoprene dispersion to a stripper column; and
   removing chloroprene from the polychloroprene dispersion in the stripper column to collect a chloroprene content $w_{CR,out}$ in an amount up to about 50 ppm, by weight, in a purified polychloroprene dispersion,
   wherein the system comprises a polymerization unit for the polymerization of chloroprene to polychloroprene in an emulsion and a multistage and/or multitray stripper column connected directly or indirectly to the polymerization unit for the removal of chloroprene from the polychloroprene dispersion,
   wherein the polymerization unit is dimensioned as a function of the formulation used so that a polychloroprene dispersion present after the polymerization having a maximum solids content $w_{solid}$ of chloroprene in the emulsion ranging up to about 50% by weight, and
   wherein the stripper column is dimensioned, as a function of the polychloroprene dispersion fed to the stripper column, to obtain a purified polychloroprene dispersion present after the removal of chloroprene having a chloroprene content $w_{CR,out}$ in an amount up to about 50 ppm by weight.

21. The system according to claim 20, wherein the stripper column at least partly has a heat-insulating and/or thermally insulating cladding.

22. The system of claim 20, wherein the maximum solids content $w_{solid}$ of chloroprene in the emulsion ranges up to about 30% by weight.

23. The system of claim 20, wherein the purified polychloroprene dispersion obtained has a chloroprene content $w_{CR,out}$ in an amount of about 10 ppm by weight.

24. A method comprising the step of joining a first part to a second part, wherein the first part and the second part are joined by an adhesive produced using a polymer dispersion based on polychloroprene and wherein the polymer dispersion has been produced by a method of producing a polymer dispersion based on polychloroprene, comprising the steps of polymerizing chloroprene to polychloroprene in an emulsion having a maximum solids content $w_{solid}$ of chloroprene in an amount up to about 50% by weight, in a polychloroprene dispersion;

adding the polycholoprene dispersion to a stripper column; and removing chloroprene from the polychloroprene dispersion in the stripper column to collect a chloroprene content $w_{CR,out}$ in an amount up to about 50 ppm, by weight in a purified polychloroprene dispersion.

* * * * *